J. T. King
Washing Machine,
No. 215. Reissued Apr. 13, 1852.
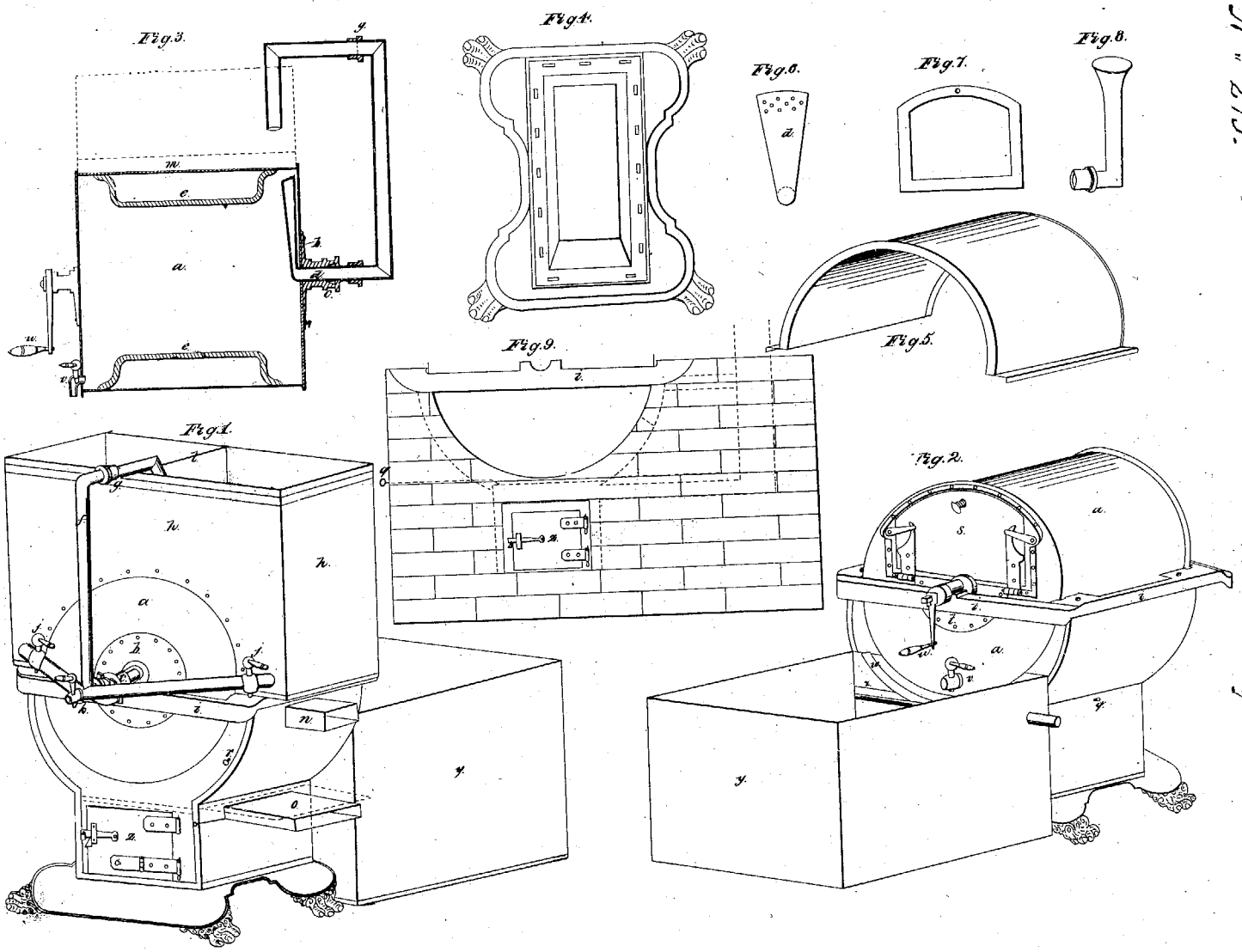
N. PETERS, PHOTO-LITHOGRAPHER, WASHINGTON, D. C.

UNITED STATES PATENT OFFICE.

JAMES T. KING, OF BALTIMORE, MARYLAND.

IMPROVEMENT IN WASHING APPARATUS.

Specification forming part of Letters Patent No. 8,446, dated October 21, 1851; Reissue No. 215, dated April 13, 1852.

*To all whom it may concern:*

Be it known that I, JAMES T. KING, of Baltimore city and county, and State of Maryland, have made certain new and useful Improvements in Washing Apparatus; and I do hereby declare the following to be a full, clear, and exact description of the same, reference being had to the accompanying drawings, making a part thereof, in which—

Figure 1 represents a perspective view of the front end and side next the flue. Fig. 2 represents a perspective view from the rear of the machine, showing the opposite side of the machine from the flue, the top boiler in this figure being removed. Fig. 3 represents a longitudinal vertical section through the machine, with the position of the top boiler in dotted lines. Fig. 4 represents the hearth of the furnace. Fig. 5 represents a cap to be placed over the revolving boiler, which may be substituted for the top boiler to complete the flue. Fig. 6 represents a front view of the pipe inside of the revolving boiler. Fig. 7 represents a frame, which may be covered with felt or any other suitable substance, to be placed in the door frame for the purpose of making it steam-tight. Fig. 8 represents a pipe and coupling-joint for feeding the boiler when the cap is used instead of the top boiler. Fig. 9 represents the front end of a furnace constructed of brick, over which the boiler may be arranged.

Similar letters in the several figures represent the same parts.

The nature of my invention consists in arranging a rotary boiler immediately over the fire, and so connecting with it a top boiler or cap-piece as to cause said rotary boiler to form one half of the flue around it, the other half being formed by said top boiler or cap, and in arranging on the inside of said revolving boiler a shielded pipe for conveying off the excess of steam, and which shall always remain vertical, whether said boiler is rotating or not; also, in conveying the excess of steam into a reservoir or boiler over the rotary boiler and heating the supply of water therein by the heat which would otherwise be wasted, when said reservoir or boiler forms the upper half of the flue.

To enable others skilled in the art to make and use my invention, I will proceed to describe the same with reference to the drawings.

*a* is a revolving boiler, the circumference of its heads projecting sufficient to cover the space between it and the edge of the top boiler or cap.

*b* is a plate with projections for the axis of the boiler and packing-chamber.

*c* is a packing-box by which the space between the pipe *d* and the axis of the boiler is made tight.

*d* is a pipe extending through the axis of the boiler *a*, and upon the inside held stationary by a brace from the frame *i*, through which pipe the boiler is filled with water and the steam allowed to escape either while the boiler is revolving or stationary.

*e* is a projection on the inside of the revolving boiler by which the position of the clothes are changed every revolution of the boiler. These projections may be made in any manner best suited to the purpose.

*f* is a pipe with a coupling-joint to connect it with pipe *d*. This pipe may extend over and into boiler *h*, through the coupling-joint *g*, which allows the end of said pipe to turn into either side of boiler *h*; or, if the cap 5 is used instead of boiler *h*, the tube No. 8 may be used instead of pipe *f*. In either case, whether the top boiler, *h*, is used or the cap Fig. 5, they form the upper half of the flue, while the revolving boiler forms the lower half, and either may be used, according to the amount of work to be done. For light work the top reservoir or boiler need not be used, the cap then completing the flue; but where a a continuous supply of water is required there is economy in using the top reservoir, inasmuch as all the waste heat and steam may be used for heating the waste in the reservoir. After supplying boiler *a* with water through it it may be turned downward to let the water out of pipe *d*, and the steam from the boiler.

*h* is a boiler placed over boiler *a*, resting upon frame *i*, the sides of said boiler projecting below its bottom sufficient to form the upper half of flue *m*. This boiler is constructed with pipes extending from both sides to pipe *f*, through which boiler *a* is supplied with water by turning stop-cock *j*.

*i* is the frame which supports the boilers, resting upon and held fast to the side plates of the furnace by screws, there being a small projection on the inside of the side plates similar to those on the frame.

*k* is a faucet connected with pipe *f*, by which the water may be let out of the pipes after supplying boiler *a*, and by which the water may be drained from boiler *h*.

*l* is a partition in boiler *h*.

*m* is the space between boilers *a* and *h*, constituting the flue by which both boilers are heated by the same fire.

*n* is a pipe to conduct smoke from the flue *m*.

*o* is the smoke-pipe with a damper in it, by which the fire is conducted away from the boilers. The dotted lines over said pipe represent the large damper by which the fire is entirely shut off from the boilers. This damper rests on a flange on the inside of each end plate of the furnace, said damper being connected with the rod *q*, running through the front side of the furnace, by which said damper is moved.

*r* is a damper which shuts off the direct draft to pipe *n*, and causes the draft to surround boiler *a*.

*s* is a door held fast by screws or springs made tight by frame 7. By this door articles are put in and taken out of the boiler.

*t* is a half-round plate with projections for the axis and handle.

*u* is the handle and crank by which boiler *a* is revolved.

*v* is the faucet by which the water is drained from boiler *a*; or, when turned upward, it may be used for letting off surplus steam before loosening the door.

*w* is a flange reveted on the furnace under boiler *a*, by which water is conducted into gutter *x*.

*x* is a gutter used for conducting off the dirty water from boiler *a*.

*y* is a tub to contain the clothes direct from the boiler.

*z* is the door of the furnace.

That the purposes for which this apparatus is intended and its good qualities may be more fully understood, I will explain the operations, as follows: Fill boiler *h* with water and boiler *a* about half-full; shut the door tight and build a fire in the furnace. As soon as steam begins to escape from boiler *a*, put in sufficient soap or any washing preparation to make good suds; give the boiler a few turns, then put in your clothes, fasten the door tight, let them stay in from three to twenty minutes, turning the boiler occasionally, the time depending upon the strength of the suds, the heat, the turning, and the nature of the clothes. If the clothes are not very much soiled, two or three lots may be washed in the same suds. As soon as these suds are dirty, let them off, first having shut the damper over the fire, then let in hot water from boiler *h*, resupply boiler *h*, and go on as before. By this operation one person (with an apparatus the revolving boiler of which is two feet long by two feet diameter with its appurtenances) will do as much washing as twelve persons can do by hand in the same time, and with less expense for fuel, soap, &c.

Having thus fully described my invention, what I claim therein as new, and desire to secure by Letters Patent, is—

1. Placing the rotary boiler for washing clothes immediately over the fire, and so combining with it a reservoir or top boiler as that said rotary boiler shall form the lower half of the flue while the said reservoir or boiler shall form the upper half of said flue, and from which the revolving boiler may be supplied with water, and thus greatly economize heat, substantially in the manner herein described and represented.

2. In combination with the rotary boiler and shielded stationary pipe, the top reservoir or boiler for receiving the excess of steam from the boiler and heating the water therein, and this I claim whether said reservoir is divided by partitions or not, the whole being arranged in the manner and for the purpose herein described.

JAMES T. KING.

Witnesses:
I. S. SMITH,
WILLIAM CAALE.